(12) United States Patent
Lee et al.

(10) Patent No.: US 8,325,678 B2
(45) Date of Patent: Dec. 4, 2012

(54) METHOD OF PERFORMING HANDOVER AND NETWORK SYSTEM OF ENABLING THE METHOD

(75) Inventors: Joo Chul Lee, Daejeon (KR); Hyoung Jun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 420 days.

(21) Appl. No.: 12/667,382

(22) PCT Filed: Jun. 30, 2008

(86) PCT No.: PCT/KR2008/003822
§ 371 (c)(1),
(2), (4) Date: Dec. 30, 2009

(87) PCT Pub. No.: WO2009/005270
PCT Pub. Date: Jan. 8, 2009

(65) Prior Publication Data
US 2011/0002300 A1    Jan. 6, 2011

(30) Foreign Application Priority Data

Jul. 3, 2007   (KR) .................. 10-2007-0066475
Aug. 20, 2007  (KR) .................. 10-2007-0083623

(51) Int. Cl.
*H04W 4/00* (2009.01)
(52) U.S. Cl. ........ 370/331; 370/329; 370/328; 370/310; 455/436; 455/439; 455/440

(58) Field of Classification Search .................. 370/254, 370/329, 331, 400, 493, 389, 401, 465; 455/458, 455/445, 417, 452.1, 406, 456.1
See application file for complete search history.

(56) References Cited

U.S. PATENT DOCUMENTS

| | | | |
|---|---|---|---|
| 2006/0018291 A1 | 1/2006 | Patel et al. | |
| 2006/0182061 A1* | 8/2006 | Naghian | 370/331 |
| 2006/0240825 A1* | 10/2006 | Funabiki et al. | 455/436 |
| 2007/0081555 A1 | 4/2007 | Yaqub | |
| 2007/0136785 A1* | 6/2007 | Warrier et al. | 726/2 |
| 2008/0130571 A1* | 6/2008 | Maeda et al. | 370/331 |
| 2008/0198807 A1* | 8/2008 | Xia et al. | 370/331 |

OTHER PUBLICATIONS

H. Yokota et al., "Fast Handovers for PMIPv6", draft-yokota-mipshop-pfmipv6-00, Jun. 2007, Section 4; Figure 2.
International Search Report for PCT/KR2008/003822 filed Jun. 30, 2008.

* cited by examiner

*Primary Examiner* — Hassan Phillips
*Assistant Examiner* — Anez Ebrahim

(57) ABSTRACT

A method of performing a handover is provided. The method of performing the handover includes: a mobile terminal transmitting an access stop message to a first Access Point (AP) when the mobile terminal moves from a first AP area to a second AP area; the first AP transmitting a handover start message to a first Mobility Access Gateway (MAG) corresponding to the first AP in response to the access stop message; the first MAG transmitting the handover start message to a Local Mobile Anchor (LMA); and the LMA performing a buffering of a data packet to be transmitted to the mobile terminal.

10 Claims, 5 Drawing Sheets

[Fig. 1]
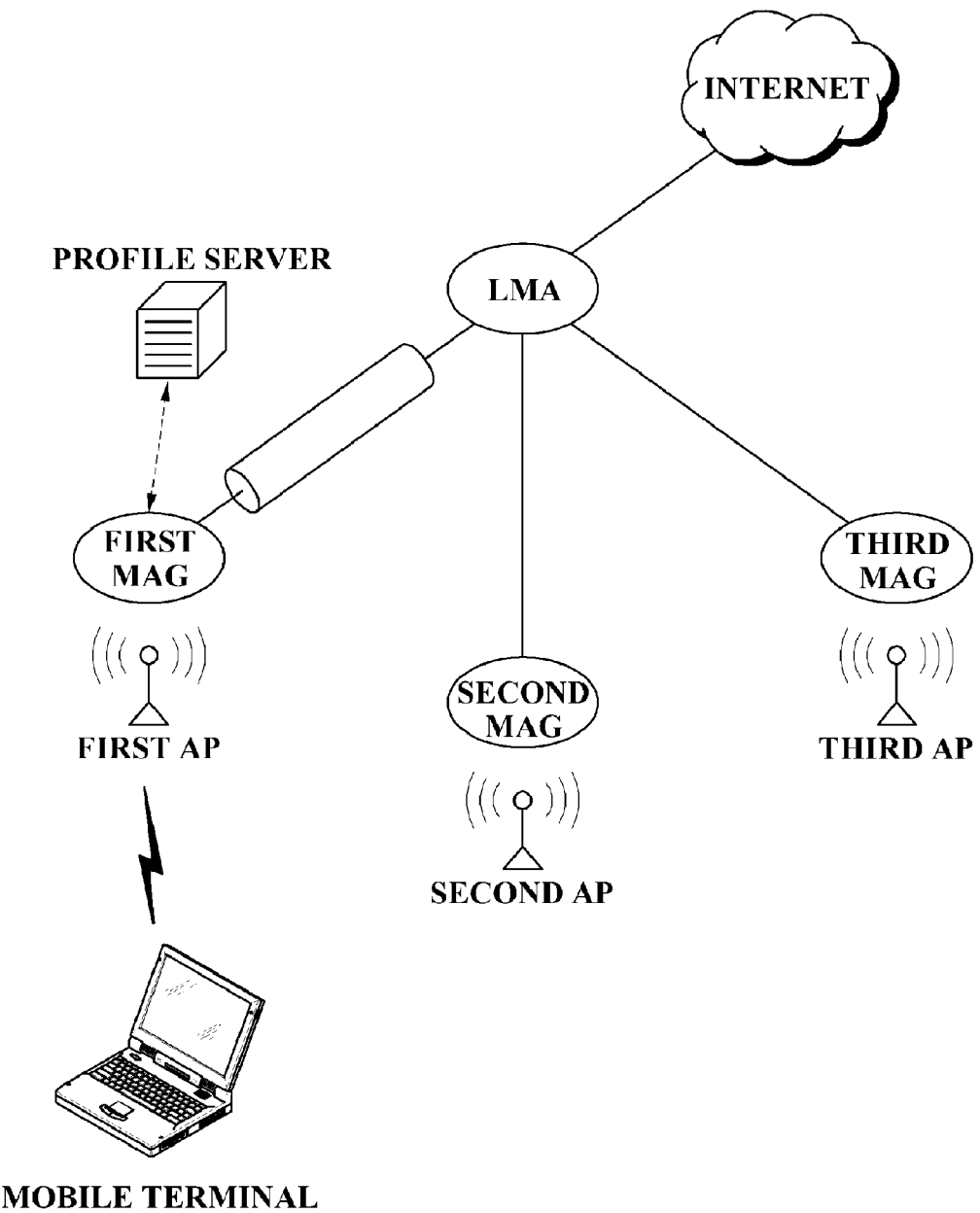

[Fig. 2]
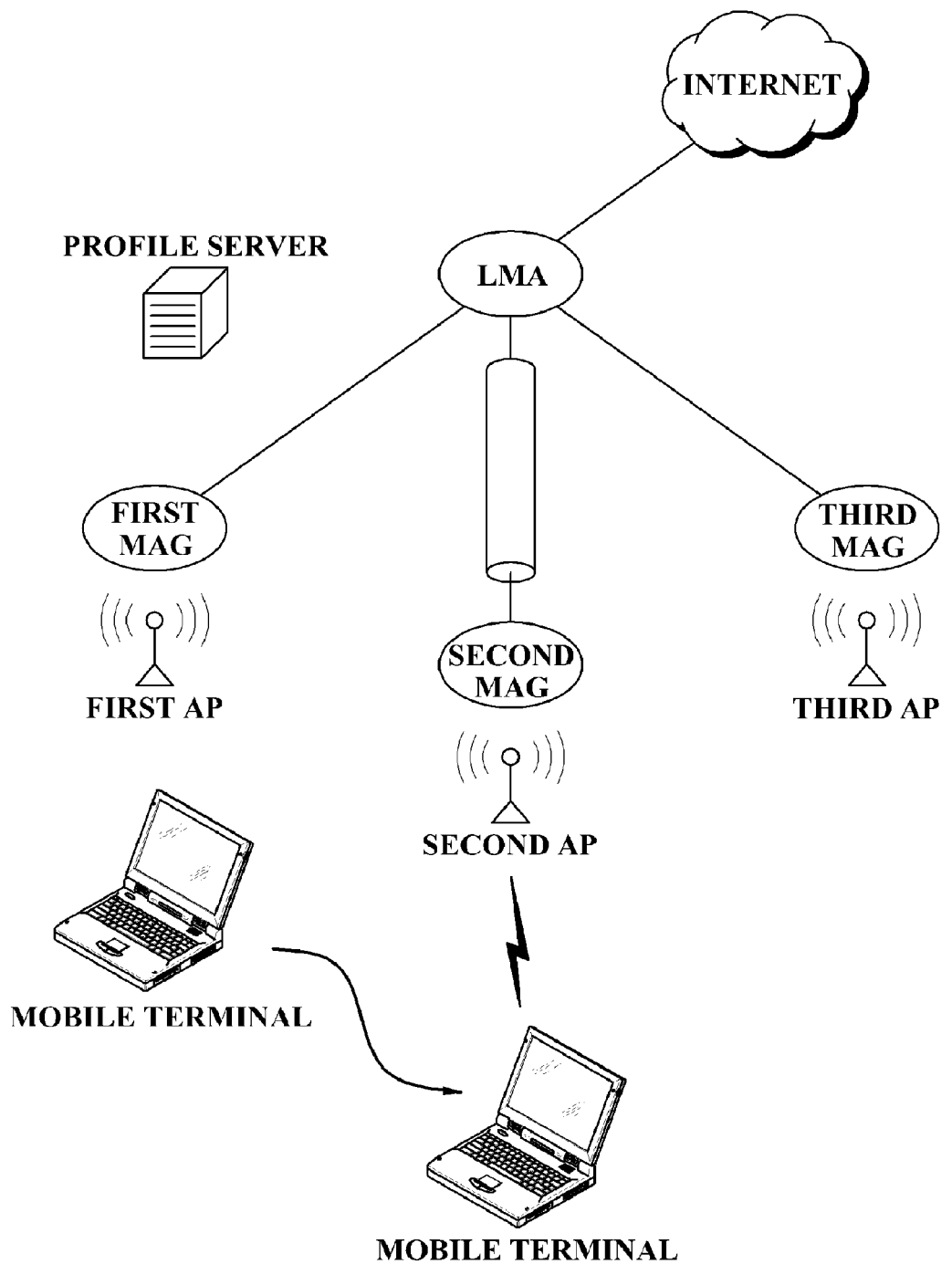

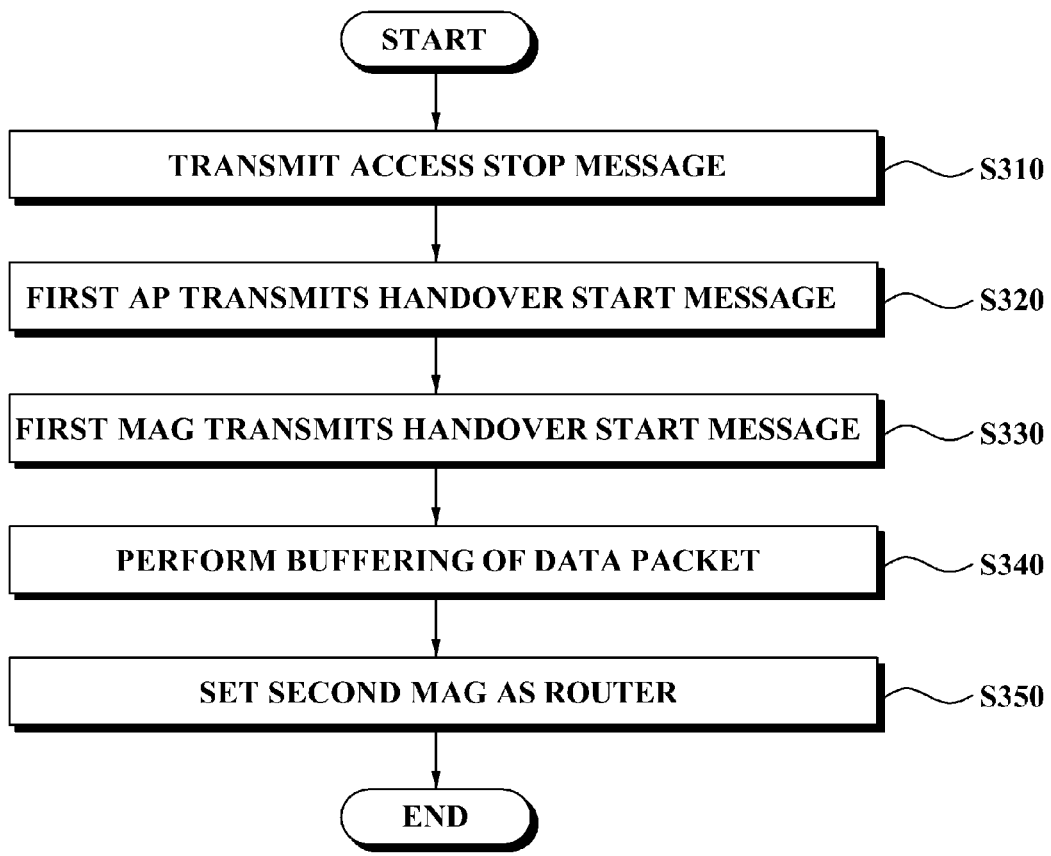

[Fig. 4]
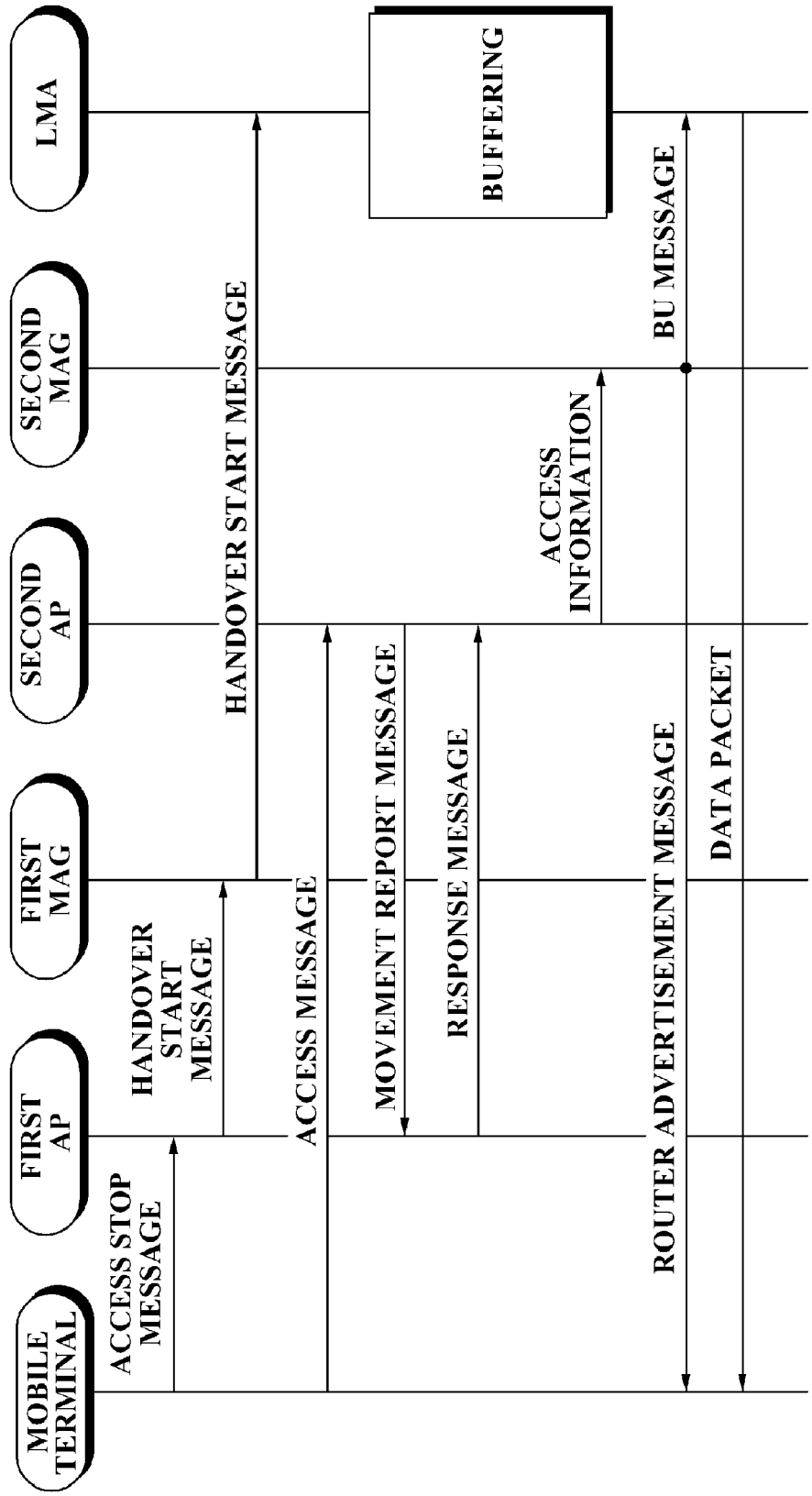

[Fig. 5]
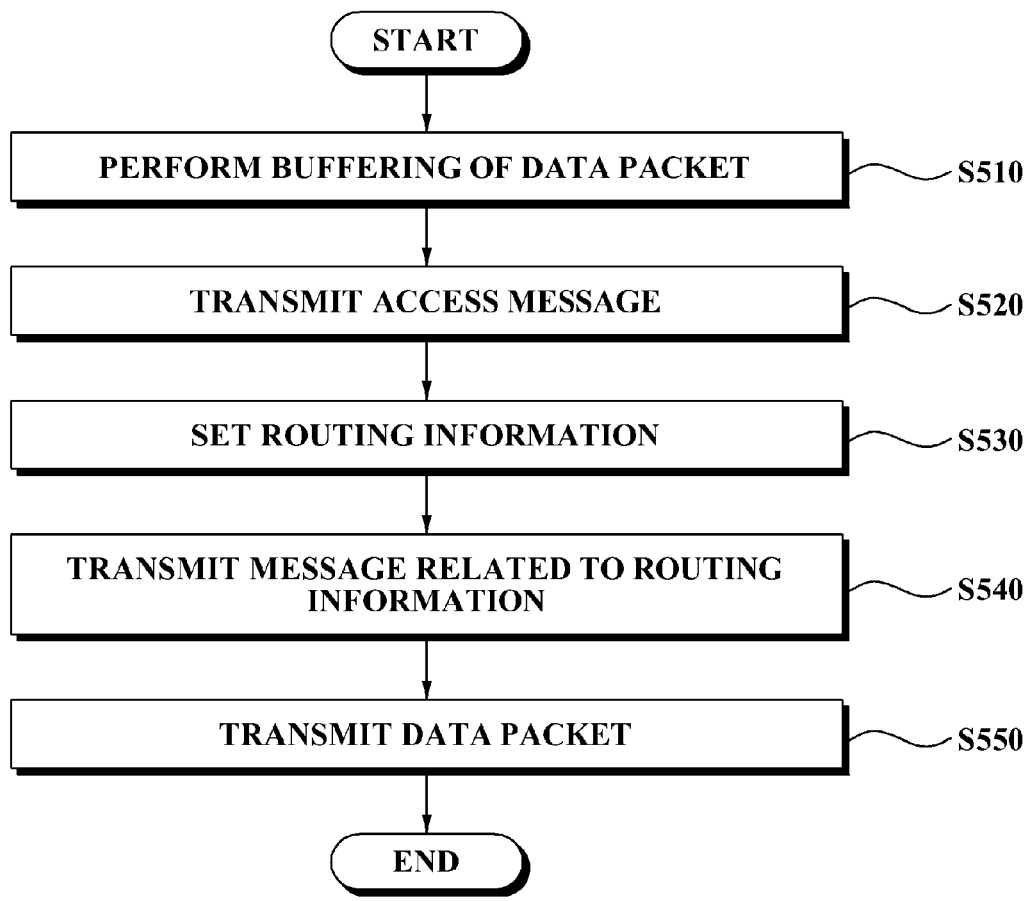

METHOD OF PERFORMING HANDOVER AND NETWORK SYSTEM OF ENABLING THE METHOD

This work was supported by the IT R&D program of MIC. [2007-p10-027, Development of Next Generation Network Standards for IPv6 based Mobility Support]

TECHNICAL FIELD

The present invention relates to a protocol of a wireless network, and more particularly, to a method of performing a handover for efficiently managing mobility of a mobile terminal, and a network system of enabling the method.

BACKGROUND ART

Communication technology has rapidly developed in a wired communication field and a wireless communication field. In particular, a use amount of a wireless communication service including the Internet and the like has increased dramatically, and users desire to use a communication service at any time and anywhere. Also, since a size of a mobile device has been miniaturized appropriately for being portable, and a performance of the mobile device has been improved, the wireless communication service has been widely provided.

In a wireless network technology field, research concerning how to perform a handover when the mobile terminal moves is actively under way. Accordingly, a technology related to Proxy Mobile Internet Protocol version 6 (PMIP6) has recently drawn special attention.

The PMIP6-related technology is a technology of supporting mobility of the mobile terminal regardless of whether a mobility support function apparatus is installed. Specifically, even when the mobile terminal moves in PMIP6, and a physical link generated between the mobile terminal and an anchor is changed, it appears as though one link is continuously maintained between the mobile terminal and the anchor. A plurality of Access Routers (ARs) directly accessed by the mobile terminal exists in a PMIP6 domain, and provides the same prefix for the mobile terminal. Accordingly, when the mobile terminal moves among the plurality of ARs, the mobile terminal appears to continuously exist in the same link.

Also, when the mobile terminal moves among the plurality of ARs, a horizontal handover is generated. A delay time generated in this instance may significantly affect a communication performance of the mobile terminal. In particular, since a time required for acquiring prefix information of the mobile terminal and a time of performing an authentication are relatively long, a scheme reducing the times is required to be researched.

Accordingly, a method of performing a handover and a network system which can reduce a delay time caused by a handover generated when a mobile terminal moves are required.

DISCLOSURE OF INVENTION

Technical Problem

The present invention provides a method of performing a handover and a network system which can efficiently perform the handover by enabling a Local Mobile Anchor (LMA) to perform a buffering of a data packet when a mobile terminal moves to another Access Point (AP) area.

The present invention also provides a method of performing a handover and a network system which can significantly reduce a delay time caused by a handover of a mobile terminal by setting a router based on home prefix information of the mobile terminal, the home prefix information being stored in a previous Mobility Access Gateway (MAG) in advance.

The present invention also provides a method of performing a handover and a network system which can efficiently set a new route by deleting home prefix information of a mobile terminal, the home prefix information being stored in a previous MAG in advance, when a new MAG is set as a router.

The present invention also provides a method of performing a handover and a network system which can reduce a delay time generated when performing a handover of a mobile terminal by enabling a new MAG to perform an authentication of the mobile terminal using authentication information of the mobile terminal, the authentication information being stored in a previous MAG in advance.

Technical Solution

According to an aspect of the present invention, there is provided a method of performing a handover, the method including: a mobile terminal transmitting an access stop message to a first Access Point (AP) when the mobile terminal moves from a first AP area to a second AP area; the first AP transmitting a handover start message to a first Mobility Access Gateway (MAG) corresponding to the first AP in response to the access stop message; the first MAG transmitting the handover start message to a Local Mobile Anchor (LMA); and the LMA performing a buffering of a data packet to be transmitted to the mobile terminal.

According to another aspect of the present invention, there is provided a method of performing a handover, the method including: an LMA performing a buffering of a data packet to be transmitted to a mobile terminal when the mobile terminal moves from a first AP area to a second AP area; the mobile terminal transmitting an access message to a second AP; a second MAG setting routing information of the mobile terminal using home prefix information of the mobile terminal, the second MAG corresponding to the second AP area, and the home prefix information being stored in advance in a first MAG corresponding to the first AP area; and the second MAG transmitting a message related to the routing information to the mobile terminal and the LMA.

According to still another aspect of the present invention, there is provided a network system including: an MAG to determine the MAG as a router of a mobile terminal using home prefix information of the mobile terminal when the mobile terminal moves from a first AP area to a second AP area, the home prefix information being stored in a first AP in advance; and an LMA to perform a buffering of a data packet to be transmitted to the mobile terminal and transmit, to the mobile terminal, the buffered data packet when the MAG is determined as the router of the mobile terminal.

In this instance, when the MAG is determined as the router of the mobile terminal, the MAG transmits, to the mobile terminal, a router advertisement message to set the MAG as the router of the mobile terminal, and transmits a Binding Update (BU) message including the home prefix information of the mobile terminal to the LMA.

BRIEF DESCRIPTION OF THE DRAWINGS

FIG. 1 illustrates a network system according to an exemplary embodiment of the present invention;

FIG. 2 illustrates a network system when a mobile terminal moves according to an exemplary embodiment of the present invention;

FIG. 3 is a flowchart illustrating a method of performing a handover according to an exemplary embodiment of the present invention;

FIG. 4 illustrates a flow of a message transceived among nodes according to an exemplary embodiment of the present invention; and FIG. 5 is a flowchart illustrating a method of performing a handover according to another exemplary embodiment of the present invention.

MODE FOR THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a network system according to an exemplary embodiment of the present invention.

Referring to FIG. 1, the network system according to the present exemplary embodiment of the present invention includes a Local Mobile Anchor (LMA), a profile server, a Mobility Access Gateway (MAG), an Access Point (AP), and a mobile terminal.

The LMA maintains location information concerning which MAG includes the mobile terminal, and packet forwarding information. The MAG actually performs a mobility management of the mobile terminal instead of the mobile terminal. Specifically, the MAG recognizes an access and a disconnection of the mobile terminal, and transmits the current location information of the mobile terminal and the packet forwarding information to the LMA.

When the mobile terminal first accesses a first MAG, the first MAG performs an authentication of the mobile terminal. Also, the first MAG accesses the profile server and acquires profile information of the mobile terminal. In this instance, the profile information includes home prefix information of the mobile terminal.

When the mobile terminal is verified to access the first MAG, the first MAG transmits a Binding Update (BU) message including the home prefix information of the mobile terminal to the LMA. The LMA sets the packet forwarding information for the mobile terminal using the home prefix information of the mobile terminal included in the BU message received from the first MAG. Also, the LMA transmits, to the first MAG, a Binding Acknowledgement (BA) message including information related to a tunnel (link) generated between the LMA and the first MAG.

The first MAG receives the BA message, and sets a tunnel establishing the first MAG and the LMA as two vertical points using the BA message. In this instance, the first MAG sets the packet forwarding information of the mobile terminal using the home prefix information of the mobile terminal.

FIG. 2 illustrates a network system when a mobile terminal moves according to an exemplary embodiment of the present invention.

When the mobile terminal moves from a first AP area to a second AP area, a second MAG is required to acquire home prefix information of the mobile terminal. Also, the second MAG is required to perform another authentication of the mobile terminal. This process is a main cause of increasing a delay time when performing a handover of the mobile terminal.

In this instance, the home prefix information of the mobile terminal and authentication information of the mobile terminal are stored in a first MAG. Accordingly, the second MAG may quickly perform the handover and the authentication of the mobile terminal using the home prefix information and the authentication information of the mobile terminal, the home prefix information and the authentication information being stored in the first MAG.

Specifically, by reporting, to an LMA, a fact that the mobile terminal moves to the second AP area, the LMA performs a buffering of a data packet to be transmitted to the mobile terminal, and the second MAG quickly uses the home prefix information and the authentication information of the mobile terminal, the home prefix information and the authentication information being stored in the first MAG. Accordingly, a delay time generated when performing the handover significantly decreases.

FIG. 3 is a flowchart illustrating a method of performing a handover according to an exemplary embodiment of the present invention.

In operation S310 of the method of performing the handover according to the present exemplary embodiment of the present invention, a mobile terminal transmits an access stop message to a first AP when the mobile terminal moves from a first AP area to a second AP area.

Also, in operation S320 of the method of performing the handover according to the present exemplary embodiment of the present invention, the first AP transmits a handover start message to a first MAG corresponding to the first AP in response to the access stop message. In this instance, the handover start message reports, to at least one of the first MAG and the LMA, a fact that the mobile terminal moves from the first AP area.

Also, in operation S330 of the method of performing the handover according to the present exemplary embodiment of the present invention, the first MAG transmits the handover start message to an LMA.

Also, in operation S340 of the method of performing the handover according to the present exemplary embodiment of the present invention, the LMA performs a buffering of a data packet to be transmitted to the mobile terminal. Specifically, since the mobile terminal moves to another AP area (another MAG), a path of the data packet to be transmitted to the mobile terminal is required to be changed. Since the changed path is unknown, the LMA minimizes a loss of the data packet generated when performing the handover by performing the buffering of the data packet to be transmitted to the mobile terminal.

Also, in operation S350 of the method of performing the handover according to the present exemplary embodiment of the present invention, the mobile terminal sets, as a router, a second MAG corresponding to a second AP based on home prefix information of the mobile terminal when the mobile terminal moves to the second AP area, the home prefix information being stored in the first MAG in advance.

Specifically, repeating a process of acquiring a home prefix of the mobile terminal from a profile server and the like may be omitted since the second MAG uses the home prefix information of the mobile terminal, the home prefix information being stored in the first MAG in advance. Accordingly, the delay time generated when performing the handover of the mobile terminal may be significantly reduced.

In this instance, the setting in operation S350 may include the second MAG setting routing information of the mobile terminal using the home prefix information of the mobile terminal, the home prefix information being stored in the first MAG in advance, and the second MAG transmitting a message related to the routing information to the mobile terminal and the LMA even though these operations are not illustrated in FIG. 3. In this instance, the message related to the routing information may include at least one of a router advertisement message and a BU message.

Also, the setting in operation S350 may include the mobile terminal transmitting an access message to the second AP, the second AP receiving a response message including the home prefix information of the mobile terminal from the first AP in response to the access message, the second AP transmitting access information generated based on the response message to the second MAG, the second MAG setting routing information of the mobile terminal based on the access information, and the second MAG transmitting a router advertisement message to the mobile terminal so that the mobile terminal may set the second MAG as the router, and transmitting a BU message including the home prefix information of the mobile terminal to the LMA even though these operations are not illustrated in FIG. 3. In this instance, the access message may include authentication information of the mobile terminal.

Also, the method of performing the handover according to the present exemplary embodiment of the present invention further includes the LMA deleting the home prefix information of the mobile terminal when the second MAG is set as the router, the home prefix information being stored in the first MAG in advance even though this operation is not illustrated in FIG. 3.

Also, the method of performing the handover according to the present exemplary embodiment of the present invention further includes the LMA transmitting, to the mobile terminal via the second MAG set as the router, the buffered data packet.

FIG. 4 illustrates a flow of a message transceived among nodes according to an exemplary embodiment of the present invention.

Referring to FIG. 4, a mobile terminal transmits an access stop message to a first AP when the mobile terminal moves from a first AP area to a second AP area. In this instance, the first AP transmits a handover start message to a first MAG in response to the access stop message, and the first MAG transmits the handover start message to an LMA. The LMA having received the handover start message performs a buffering of a data packet to be transmitted to the mobile terminal.

Also, the mobile terminal transmits an access message to the second AP. In this instance, the second AP transmits a movement report message to the first AP in response to the access message, and the first AP transmits a response message to the second AP in response to the movement report message. In this instance, the response message may include home prefix information and authentication information of the mobile terminal.

The second AP receives the response message from the first AP, and transmits, to the second MAG, access information generated based on the response message. In this instance, the access information may include the home prefix information and the authentication information of the mobile terminal.

The second MAG sets routing information of the mobile terminal based on the access information. In this instance, the routing information includes information related to a link establishing the LMA and the second MAG as vertical points.

Also, the second MAG transmits a router advertisement message to the mobile terminal so that the mobile terminal may set the second MAG as the router, and transmits a BU message including the home prefix information of the mobile terminal to the LMA. The mobile terminal having received the router advertisement message sets the second MAG as the router, and the LMA having received the BU message sets packet forwarding information of the mobile terminal.

Also, the LMA transmits, to the mobile terminal via the second MAG set as the router, the buffered data packet, according to the set packet forwarding information. In this instance, the LMA may delete the home prefix information of the mobile terminal, the home prefix information being stored in the first MAG.

FIG. 5 is a flowchart illustrating a method of performing a handover according to another exemplary embodiment of the present invention.

In operation S510 of the method of performing the handover according to the present exemplary embodiment of the present invention, an LMA performs a buffering of a data packet to be transmitted to a mobile terminal when the mobile terminal moves from a first AP area to a second AP area.

Also, in operation S520 of the method of performing the handover according to the present exemplary embodiment of the present invention, the mobile terminal transmits an access message to a second AP.

Also, in operation S530 of the method of performing the handover according to the present exemplary embodiment of the present invention, a second MAG sets routing information of the mobile terminal using home prefix information of the mobile terminal, the second MAG corresponding to the second AP area, and the home prefix information being stored in advance in a first MAG corresponding to the first AP area.

In this instance, the setting in operation S530 includes the second AP transmitting a movement report message to the first AP in response to the access message, the first AP transmitting a response message including the home prefix information of the mobile terminal in response to the movement report message to the second AP, the home prefix information being stored in the first MAG in advance, and the second MAG receiving the response message and setting the routing message of the mobile terminal using the response message.

Also, in operation S540 of the method of performing the handover according to the present exemplary embodiment of the present invention, the second MAG transmits a message related to the routing information to the mobile terminal and the LMA. In this instance, the message related to the routing information may include at least one of a router advertisement message and a BU message.

In this instance, the transmitting of the message related to the routing information in operation S540 transmits, to the mobile terminal, a router advertisement message enabling the mobile terminal to set the second MAG as a router, and transmits a BU message including the home prefix information of the mobile terminal to the LMA.

Also, in operation S550 of the method of performing the handover according to the present exemplary embodiment of the present invention, the LMA transmits, to the mobile terminal via the second MAG, the buffered data packet.

The method of performing the handover according to the exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a method of performing a handover and a network system which can efficiently perform the handover by enabling an LMA to perform a buffering of a data packet when a mobile terminal moves to another AP area.

Also, according to the present invention, there is provided a method of performing a handover and a network system which can significantly reduce a delay time caused by a handover of a mobile terminal by setting a router based on home prefix information of the mobile terminal, the home prefix information being stored in a previous MAG in advance.

Also, according to the present invention, there is provided a method of performing a handover and a network system which can efficiently set a new route by deleting home prefix information of a mobile terminal, the home prefix information being stored in a previous MAG in advance, when a new MAG is set as a router.

Also, according to the present invention, there is provided a method of performing a handover and a network system which can reduce a delay time generated when performing a handover of a mobile terminal by enabling a new MAG to perform an authentication of the mobile terminal using authentication information of the mobile terminal, the authentication information being stored in a previous MAG in advance.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of performing a handover, the method comprising:
    a mobile terminal transmitting an access stop message to a first Access Point (AP) when the mobile terminal moves from a first AP area to a second AP area;
    the first AP transmitting a handover start message to a first Mobility Access Gateway (MAG) corresponding to the first AP in response to the access stop message;
    the first MAG transmitting the handover start message to a Local Mobile Anchor (LMA);
    the LMA performing a buffering of a data packet to be transmitted to the mobile terminal;
    the LMA deleting home prefix information of the mobile terminal when the second MAG is set as the router, the home prefix information being stored in the first MAG in advance;
    the mobile terminal setting, as a router, a second MAG corresponding to a second AP based on the home prefix information of the mobile terminal when the mobile terminal moves to the second AP area, the home prefix information being stored in the first MAG in advance; and
    performing an authentication of the mobile terminal based on authentication information of the mobile terminal, the authentication information being stored in the first MAG in advance.

2. The method of claim 1, further comprising:
    the LMA transmitting, to the mobile terminal via the second MAG set as the router, the buffered data packet.

3. The method of claim 1, wherein the setting comprises:
    the second MAG setting routing information of the mobile terminal using the home prefix information of the mobile terminal, the home prefix information being stored in the first MAG in advance; and
    the second MAG transmitting a message related to the routing information to the mobile terminal and the LMA.

4. The method of claim 1, wherein the setting comprises: the mobile terminal transmitting an access message to the second AP; the second AP receiving a response message including the home prefix information of the mobile terminal from the first AP in response to the access message; the second AP transmitting access information generated based on the response message to the second MAG; the second MAG setting routing information of the mobile terminal based on the access information; and the second MAG transmitting a router advertisement message to the mobile terminal so that the mobile terminal may set the second MAG as the router, and transmitting a Binding Update (BU) message including the home prefix information of the mobile terminal to the LMA.

5. A method of performing a handover, the method comprising:
    a Local Mobile Anchor (LMA) buffering a data packet to be transmitted to a mobile terminal when the mobile terminal moves from a first Access Point (AP) area to a second AP area;
    the mobile terminal transmitting an access message to a second AP;
    a second Mobility Access Gateway (MAG) setting routing information of the mobile terminal using home prefix information of the mobile terminal, the second MAG corresponding to the second AP area, the home prefix information being stored in advance in a first MAG corresponding to the first AP area;
    the mobile terminal setting, as a router, the second MAG based on the home prefix information of the mobile terminal when the mobile terminal moves to the second AP area,
    the second MAG transmitting a message related to the routing information to the mobile terminal and the LMA;
    the LMA deleting the home prefix information of the mobile terminal when the second MAG is set as the router; and
    performing an authentication of the mobile terminal based on authentication information of the mobile terminal, the authentication information being stored in the first MAG in advance.

6. The method of claim 5, wherein the transmitting of the message related to the routing information transmits, to the mobile terminal, a router advertisement message enabling the mobile terminal to set the second MAG as a router, and transmits a BU message including the home prefix information of the mobile terminal to the LMA.

7. The method of claim 5, further comprising:
    the LMA transmitting, to the mobile terminal via the second MAG, the buffered data packet.

8. The method of claim 5, wherein the setting comprises:
the second AP transmitting a movement report message to the first AP in response to the access message;
the first AP transmitting a response message including the home prefix information of the mobile terminal in response to the movement report message to the second AP, the home prefix information being stored in the first MAG in advance; and
the second MAG receiving the response message and setting the routing message of the mobile terminal using the response message.

9. A network system comprising:
a Mobility Access Gateway (MAG) that determines the MAG as a router of a mobile terminal using home prefix information of the mobile terminal when the mobile terminal moves from a first Access Point (AP) area to a second AP area, the home prefix information being stored in a first MAG in advance, the MAG corresponding to the second AP; and
a Local Mobile Anchor (LMA) that performs a buffering of a data packet to be transmitted to the mobile terminal, transmits, to the mobile terminal, the buffered data packet when the MAG is determined as the router of the mobile terminal, and deletes the home prefix information of the mobile terminal when the MAG is set as the router,
wherein the mobile terminal sets, as a router, the MAG based on the home prefix information of the mobile terminal when the mobile terminal moves to the second AP area, and
wherein the MAG performs an authentication of the mobile terminal based on authentication information of the mobile terminal, the authentication information being stored in the first MAG in advance.

10. The system of claim 9, wherein, when the MAG is determined as the router of the mobile terminal, the MAG transmits, to the mobile terminal, a router advertisement message to set the MAG as the router of the mobile terminal, and transmits a BU message including the home prefix information of the mobile terminal to the LMA.

* * * * *